United States Patent
Raiskin

(10) Patent No.: US 11,416,244 B2
(45) Date of Patent: Aug. 16, 2022

(54) SYSTEMS AND METHODS FOR DETECTING A RELATIVE POSITION OF A WEBPAGE ELEMENT AMONG RELATED WEBPAGE ELEMENTS

(71) Applicant: PAYPAL, INC., San Jose, CA (US)

(72) Inventor: Yarden Raiskin, Giv'atayim (IL)

(73) Assignee: PayPal, Inc., San Jose, CA (US)

( * ) Notice: Subject to any disclaimer, the term of this patent is extended or adjusted under 35 U.S.C. 154(b) by 147 days.

(21) Appl. No.: 16/837,840

(22) Filed: Apr. 1, 2020

(65) Prior Publication Data
US 2021/0311728 A1 Oct. 7, 2021

(51) Int. Cl.
*G06F 9/451* (2018.01)
*G06F 8/38* (2018.01)
(Continued)

(52) U.S. Cl.
CPC ............ *G06F 8/73* (2013.01); *G06F 16/9566* (2019.01); *G06F 16/986* (2019.01);
(Continued)

(58) Field of Classification Search
CPC . G06F 8/73; G06F 8/38; G06F 16/986; G06F 16/9566; G06F 16/954; G06F 16/9535; G06F 16/9577; G06F 16/93; G06F 16/951; G06F 16/953; G06F 16/9574; G06F 40/295; G06F 8/75; G06F 40/279; G06F 40/131; G06F 40/14; G06F 40/221; G06F 40/226; G06N 20/00; G06N 5/04; G06Q 20/227; G06Q 20/4016
See application file for complete search history.

(56) References Cited

U.S. PATENT DOCUMENTS 8,655,913 B1 2/2014 Shah et al.
2011/0173569 A1* 7/2011 Howes ................ G06F 16/9574
715/835
(Continued)

OTHER PUBLICATIONS

Chaitanya Kallepalli et al., Measuring and Modeling Usage and Reliability for Statistical Web Testing, IEEE Nov. 2001, [Retrieved on Nov. 22, 2016]. Retrieved from the internet: <URL: https://ieeexplore.ieee.org/stamp/stamp.jsp?tp=&arnumber=965342> 14 Pages (1023-1036) (Year: 2001).*

(Continued)

*Primary Examiner* — Anibal Rivera
(74) *Attorney, Agent, or Firm* — Haynes and Boone, LLP

(57) ABSTRACT

Methods and systems are presented for automatically detecting positions of various webpage elements within a webpage when the webpage is rendered, based on analyzing the programming code of the webpage using graph-based and NLP-based techniques. A position detection system obtains the programming code of the webpage and generates a DOM tree based on the programming code. A group of leaf tags may be identified based on traversing the DOM tree. The position detection system may use two different, but coordinated, prediction models to make the classification prediction for the leaf tags, where the first prediction model focuses on recall by identifying as many positive leaf tags as possible at the cost of low precision and the second prediction model refines the results from the first prediction model by improving the precision of the classification.

20 Claims, 7 Drawing Sheets

(51) Int. Cl.

| | | |
|---|---|---|
| *G06F 8/73* | (2018.01) | |
| *G06F 16/958* | (2019.01) | |
| *G06F 16/955* | (2019.01) | |
| *G06F 40/295* | (2020.01) | |
| *G06N 5/04* | (2006.01) | |
| *G06Q 20/22* | (2012.01) | |
| *G06Q 20/40* | (2012.01) | |
| *G06N 20/00* | (2019.01) | |
| *G06F 16/957* | (2019.01) | |
| *G06F 40/131* | (2020.01) | |
| *G06F 16/9535* | (2019.01) | |
| *G06F 40/279* | (2020.01) | |
| *G06F 40/221* | (2020.01) | |
| *G06F 40/226* | (2020.01) | |
| *G06F 16/954* | (2019.01) | |

(52) U.S. Cl.
CPC ............ *G06F 40/295* (2020.01); *G06N 5/04* (2013.01); *G06N 20/00* (2019.01); *G06Q 20/227* (2013.01); *G06Q 20/4016* (2013.01); *G06F 16/954* (2019.01); *G06F 16/9535* (2019.01); *G06F 16/9574* (2019.01); *G06F 16/9577* (2019.01); *G06F 40/131* (2020.01); *G06F 40/221* (2020.01); *G06F 40/226* (2020.01); *G06F 40/279* (2020.01)

(56) References Cited

U.S. PATENT DOCUMENTS

| | | | |
|---|---|---|---|
| 2014/0280519 | A1 | 9/2014 | Wyler et al. |
| 2016/0127410 | A1* | 5/2016 | Borohovski .......... G06F 16/951 726/1 |
| 2017/0270416 | A1 | 9/2017 | Sri et al. |
| 2017/0278085 | A1 | 9/2017 | Anderson et al. |
| 2017/0300966 | A1* | 10/2017 | Dereszynski ...... G06Q 30/0254 |
| 2020/0242170 | A1* | 7/2020 | Pogrebezky .......... G06F 16/986 |
| 2021/0141497 | A1* | 5/2021 | Magureanu ............. G06F 9/451 |
| 2021/0141499 | A1* | 5/2021 | Barrett .................... G06F 9/461 |
| 2021/0141619 | A1* | 5/2021 | Magureanu ............... G06F 8/38 |
| 2021/0141620 | A1* | 5/2021 | Magureanu ............ G06N 20/00 |
| 2021/0216334 | A1* | 7/2021 | Barrett ................... G06N 20/00 |

OTHER PUBLICATIONS

International Application No. PCT/US2021/025098, International Search Report and Written Opinion dated Jun. 10, 2021, 8 pages.

* cited by examiner

```
<div class="form-row label-inline ">
<div class="field-wrapper">
<input id="is-PAYPAL" type="radio" class="input-radio "
name="dwfrm_billing_paymentMethods_selectedPaymentMethodID"
value="PAYPAL">
<label for="is-PAYPAL">
PayPal
</label>
</div>
</div>
```
⎫
⎬ 506
⎭

```
<div class="form-row label-inline ">
<div class="field-wrapper">
<input id="is-DW_APPLE_PAY" type="radio" class="input-radio "
name="dwfrm_billing_paymentMethods_selectedPaymentMethodID"
value="DW_APPLE_PAY">
<label for="is-DW_APPLE_PAY">
Apple Pay
</label>
</div>
</div>
```
⎫
⎬ 508
⎭

Figure 5

SYSTEMS AND METHODS FOR DETECTING A RELATIVE POSITION OF A WEBPAGE ELEMENT AMONG RELATED WEBPAGE ELEMENTS

BACKGROUND

The present specification generally relates to automatic detection of locations of webpage elements within a webpage, and more specifically, to detecting locations of various webpage elements within the webpage based on analyzing programming code of the webpage according to various embodiments of the disclosure.

RELATED ART

Many websites include webpage elements associated with other websites (e.g., links to third-party websites) that offer auxiliary content and/or services to end users. For example, a merchant website may present, in a merchandise checkout webpage, links to third-party digital payment service providers, such as PAYPAL®, APPLE PAY®, and other payment service providers for facilitating electronic payment transactions for purchases arising from the merchant website. The positions of the links that appear on the merchant webpage when the merchant webpage is rendered on a device of an end user may affect one or more of: a probability of the end user selecting one of the links (e.g., selecting one of the payment service providers, etc.), a risk associated with the transaction, and other factors, that may be consequential for the third-party payment service providers.

Furthermore, a third-party digital payment service provider may have an existing agreement with the merchant, specifying that a link associated with the third-party digital payment service provider should be presented at a specific position within the checkout webpage (e.g., to appear at a first position among all payment options presented in the checkout webpage, etc.). However, the layout (or formatting) rules for the webpage (e.g., a layout structure and/or CSS code associated with the webpage) may cause the link to be rendered at a different position (either intentionally or inadvertently done by the merchant). It is often difficult to detect the positions of the webpage elements in various webpages, except by rendering the webpages on a device and manually checking the rendered webpages. Manually inspecting webpages can be time consuming and costly. Thus, there is a need for automatically detecting positions of webpage elements within a webpage.

BRIEF DESCRIPTION OF THE FIGURES

FIG. 5 illustrates exemplary programming code associated with a webpage according to an embodiment of the present disclosure;

Figure 1:
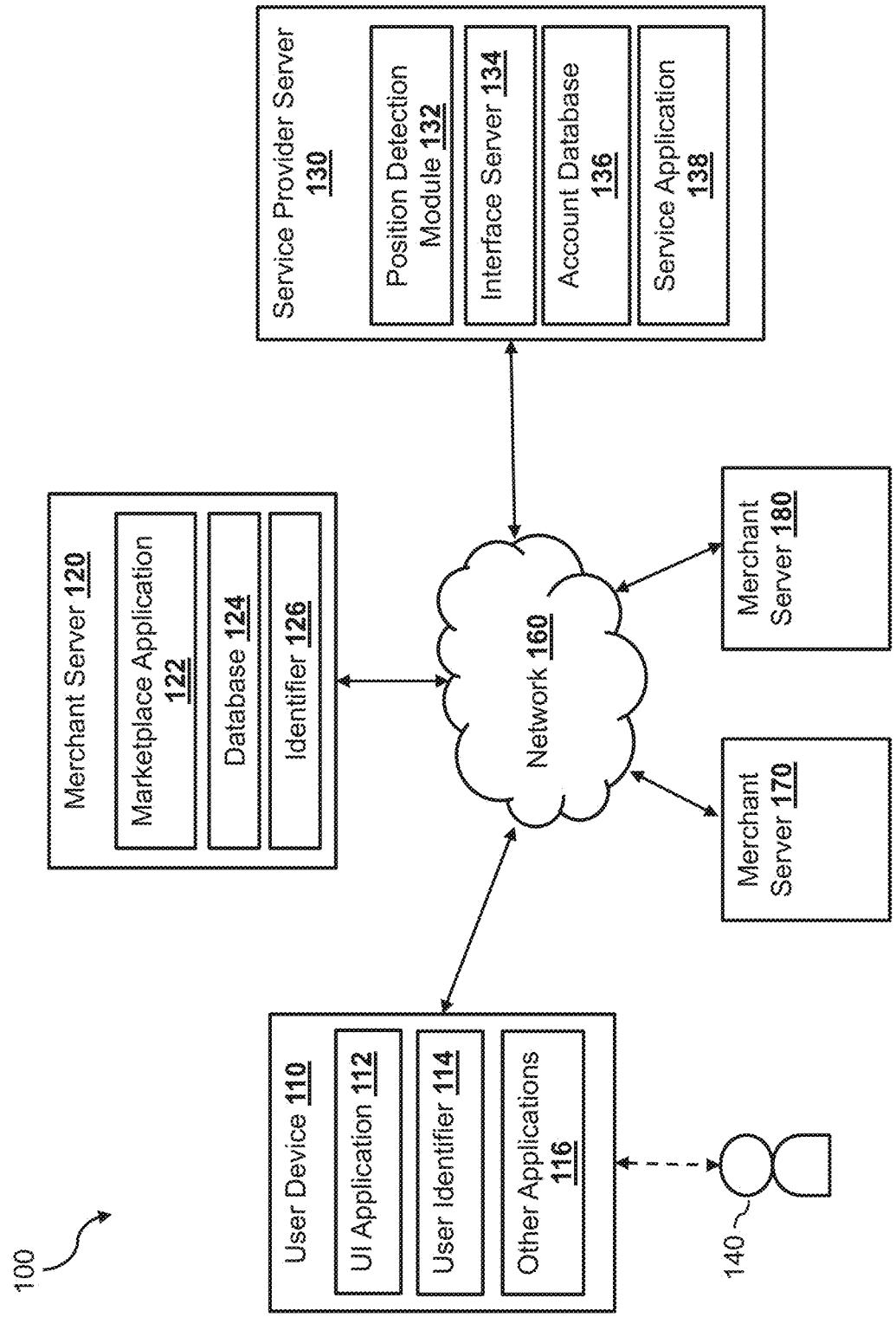
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically detecting positions of various webpage elements within a webpage when the webpage is rendered, based on analyzing the programming code of the webpage using graph-based and natural language processing (NLP) based techniques. For example, the webpage may be a transaction checkout webpage associated with a merchant website, and may have different webpage elements, including links and/or other data (e.g., text, images) associated with different digital payment options (e.g., PayPal®, Apple Pay®, Google Pay®, VISA®, American Express®, etc.). These payment options may be associated with the same or different payment service providers. These webpage elements enable a consumer of the merchant to select a payment method for the transaction with the merchant.

The different webpage elements associated with the digital payment options may appear in a specific order (e.g., from left to right, from top to bottom, etc.) when the webpage is rendered on a display device, depending on how the webpage is designed (and the structure of the programming code associated with the webpage). The order in which the webpage elements associated with the digital payment options may cause an online service provider (e.g., one of the digital payment options) to perform an action to the webpage or cause the online service provider to analyze a transaction request received via the webpage differently.

As discussed herein, automatically detecting the positions of the webpage elements can be challenging. For example, different entities (e.g., different merchants, different website hosts) may implement their webpages differently, such that the structures and/or the content (e.g., text) of the programming code for implementing these webpage elements in different webpages may be different. One entity may use a frame structure (e.g., using the <iframe> tag, etc.) to contain all of the webpage elements associated with the digital payment options while another may use a list structure (e.g., using one or more <div> tags, etc.) to contain the same webpage elements. Furthermore, different entities may use different naming conventions for naming the content within the webpage elements. One entity may name an image of a PayPal logo "paypal_payment_image" while another entity may name the same image "pp_icon". In other words, there are no set defined rules in how these webpage elements are implemented.

Thus, according to various embodiments of the disclosure, a position detection system may analyze the programming code associated with the webpage using the graph-based and NLP-based techniques to identify various webpage elements associated with different payment options within the webpage. Once the various related webpage elements within the webpage are identified, the position detection system may determine an order in which the related webpage elements are displayed or one or more positions of one or more particular webpage elements corresponding to specific payment options (or specific payment service providers). For example, the position detection system may identify that a first webpage element is a first payment option for a first payment service provider (e.g., PayPal®), a second webpage element is a second payment option for a second payment service provider (e.g., Apple Pay®), a third webpage element is a third payment option for a third payment service provider (e.g., VISA®), and so forth. Based on the positions of the portion of the programming code associated with the various identified webpage elements within the webpage, the position detection system may determine relative positions of any one particular webpage element among the related webpage elements associated with the payment options.

In some embodiments, the position detection system may include (or have access to) a web crawler (e.g., a software program that accesses data over the Internet) to access one or more transaction checkout webpages (associated with one or more merchants). For example, the web crawler may access different webpages by traversing a list of network addresses (e.g., uniform resource locator (URL) addresses, etc.) associated with different merchants. In some embodiments, the position detection system may access the transaction checkout webpage by initiating a transaction checkout process at a merchant website. For example, the web crawler may emulate an end-user initiating a transaction with a merchant website. The web crawler may first access the merchant website (e.g., a homepage or a portal of the merchant website), arbitrarily select one or more offerings from the merchant website for purchase (e.g., by adding the one or more offerings to an electronic shopping cart of the merchant website), and then initiate the checkout process via the merchant website (e.g., selecting a checkout option on the merchant website) to access a transaction checkout page of the merchant website.

The position detection system may then obtain programming code associated with the webpage (e.g., by downloading the source code of the transaction checkout webpage). The position detection system may analyze the programming code associated with the webpage to identify a group of related webpage elements within the webpage. In the example where the webpage is the transaction checkout webpage of a merchant website, the group of related webpage elements may be associated with payment options that an end user of the merchant website may select for performing a payment of a transaction with the merchant website.

In some embodiments, upon obtaining the programming code associated with the webpage, the position detection system may generate (e.g., build) a document object model (DOM) tree based on the programming code. A DOM tree is a computer platform and programming language independent structure that represents webpage elements within a webpage as a tree structure. The DOM tree may include nodes, where a node (or a group of nodes) in the DOM tree corresponds to a webpage element or a sub-element within the webpage (e.g., the tags and/or attributes associated with the webpage element). For example, the root node (or the root group of nodes) in the DOM tree may correspond to a root tag (e.g., the <html> tag) within the webpage. As webpage elements and sub-elements may be nested within other webpage elements within the programming code structure of the webpage, the DOM tree that is generated based on the programming code of the webpage may represent the different levels of nesting of webpage elements and sub-elements within the webpage as different levels of nodes, where each level within the DOM tree structure corresponds to a nesting level (e.g., tag level) within the programming code. Thus, when the webpage has a nested structure (e.g., one or more nested tags), the position detection system may generate the DOM tree to have multiple levels, where each nested structure is represented by a level within the DOM tree. As such, the DOM tree may represent how the webpage elements (e.g., text, images, multi-media content, user interface elements such as a link, a button, a check-box, a text box, a radio button, etc.) are presented when the webpage is rendered by a software application (e.g., a web browser).

In some embodiments, the position detection system may use one or more graph-based techniques to analyze the DOM tree to identify a set of webpage elements that are related to each other (also referred to as "leaf tags"). As related webpage elements usually follow a particular programming code structure element that is similar among each other and are nested within the same level (e.g., siblings) within the programming code (and usually on the lower level(s) of the tree such as the leaf node level), the position detection system of some embodiments may identify the set of leaf tags that (i) are within the same level within the DOM tree structure having a common parent node and (ii) share particular programming code structures that follow predetermined patterns.

In some embodiments, the position detection system may pre-process the DOM tree by removing any nodes that are deemed to be irrelevant to the payment options based on the tags included in the nodes. For example, the position detection system may remove any nodes and their descendant nodes in the DOM tree when the node includes a tag from the following exclusion list of tags: a <title> tag, a <script> tag, a <noscript> tag, a <meta> tag, a <link> tag, a <style> tag, a <font> tag, and a <svg> tag. The position detection system may also remove certain inline tags from the nodes that are deemed to be irrelevant to the determination of whether a node is associated with a payment option or not. For example, the position detection system may remove any inline tags from the nodes (but keeping the rest of the content and their descendent nodes) such as an <abbr> tag, an <acronym> tag, a <b> tag, a <bdo> tag, a <big> tag, a <br> tag, a <cite> tag, a <code> tag, a <dfn> tag, an <em> tag, an <i> tag, an <kbd> tag, an <output> tag, a <q> tag, a <samp> tag, a <small> tag, a <span> tag, and a <strong> tag. In particular, the position detection system may retain, in the nodes, inline tags that are deemed relevant to the determination of whether a node is associated with a payment option, such as an <a> tag, a <button> tag, an <img> tag, an <input> tag, a <label> tag, a <script> tag, and a <select> tag.

After pre-processing the nodes in the DOM tree, the position detection system may then traverse the nodes in the DOM tree according to a depth-first-search order to identify any nodes and/or branches of nodes as leaf tags. A branch of nodes is a portion of the DOM tree including a local root node and its descendant nodes. The leaf tags are webpage element candidates that will be further analyzed by the position detection system to determine whether the webpage element candidates are associated with any one of the payment options. In some embodiments, while traversing the nodes in the DOM tree, the position detection system may identify any node that is either a leaf node or that includes a relevant tag for determining whether the node is associated with a payment option (e.g., a tag that is part of a set of predefined tags including <a> tag, an <iframe> tag, an <img> tag, an <input> tag, and a <button> tag) as a leaf tag. If it is determined that the identified node (e.g., the leaf node) includes only displayable text (e.g., not having any HTML tags), the position detection system may include the parent node and its descendant nodes (the branch of nodes having the parent node as the root node) in the leaf tag.

It is also common for the programming code that represents a payment option to have nested webpage elements due to the programmatic nature of the generation of webpage programming code (e.g., HyperText Markup Language). For example, a webpage element that includes only text associated with the payment option may be nested within a hyperlink webpage element (e.g., indicated by an <a> tag) for linking to a payment service provider server associated with the payment option, which in turn may be nested within one or more division webpage elements (e.g., indicated by a <div> tag). When a list of related webpage elements (e.g., a list of payment options) is included in a webpage, the webpage elements (multiple of them) would be implemented within the same level in the DOM tree structure having a common parent node (e.g., they are sibling nodes). In the example above, the related webpage elements most likely will not be in the same level as the text webpage element or the hyperlink webpage element, but rather either one of the division webpage elements. Thus, when the position detection system reaches a node (e.g., representing the hyperlink webpage element) that may be identified as a leaf tag based on the criteria discussed above, the position detection system may determine whether the node (or the branch of nodes) has any siblings (e.g., other nodes or branches of nodes in the same level of the DOM tree that share the same parent node). If it is determined that the node (or the branch of nodes) has one or more siblings within the DOM tree, the position detection system may classify the node (or the branch of nodes) and its siblings as leaf tags. On the other hand, if it is determined that the node (or the branch of nodes) has no siblings within the DOM tree, the position detection system may iteratively traverse upward to a parent node (e.g., to the node that represents the division webpage element) until it is determined that the branch of node (including the parent node) has one or more siblings, in which case, the position detection system may classify the branch of node (including the parent node) and its siblings as leaf tags. In the case where the position detection system reaches the root node of the DOM tree, the position detection system may ignore that branch of nodes and continue to traverse the next branch in the DOM tree.

Once the position detection system determines a set of leaf tags based on analyzing the DOM tree, the position detection system of some embodiments may analyze the leaf tags to determine whether each of the leaf tags in the set of leaf tags corresponds to a payment option, and if so, which particular payment option is associated with the leaf tag using one or more NLP-based techniques. In some embodiments, to enhance the speed of analyzing the leaf tags, the position detection system may apply a cleansing process to the leaf tags to eliminate data irrelevant to the determination process. The cleansing process may include, for any node in the set of leaf tags, removing any protocol, query string, and any directory except the last directory referenced in any uniform resource locator (URL) referencing attributes. For example, the position detection system may identify any attribute values corresponding to URL referencing attributes, such as a <href> tag, a <src> tag, etc. The position detection system may remove, from the identified attribute value any protocol or query string (e.g., the portion of the attribute value after a "?" character). The position detection system may also remove all folders referenced in the attribute value except the last one (the folder that stores the webpage). Thus, the position detection system will turn a URL attribute value of "https://assets.secure.checkout.visa-.com/wallet-services-web/xo/button.png?color=neutral&cobrand=false&svg=true&legacy=true" to "assets.secure.checkout.visa.com/button".

In some embodiments, the cleansing process may also include removing any attributes in the nodes except the following set of attributes: 'name,' 'class,' 'id,' 'title,' 'alt,' 'value,' 'src,' and 'href'. The cleansing process may also include removing multiple spaces and new lines. The cleansing process may also turn all characters in the attributes to either uppercase or lowercase. Furthermore, the cleansing process may include removing any node that has content exceeding a threshold (e.g., 1,200 characters).

The cleansed leaf tags may then be analyzed by the position detection system. In some embodiments, the position detection system may use a two-step approach in analyzing the leaf tags, to determine whether a leaf tag corresponds to a payment option and which payment option the leaf tag is associated with. Since many of the webpages obtained by the position detection system may not be a merchant checkout page, and even within a merchant checkout page, most of the leaf tags may not correspond to a payment option, the classification of leaf tag has a heavy class imbalance (e.g., majority of the leaf tags will not correspond to a payment option). It has been observed that only 1 out of 1,000 leaf tags analyzed actually corresponds to a payment option. Thus, according to some embodiments of the disclosure, the position detection system may use two different, but coordinated, prediction models to make the classification prediction, where the first prediction model (e.g., a candidate prediction model) focuses on recall (e.g., identifying as many positive leaf tags as possible at the cost of low precision) and the second prediction model (e.g., a refined prediction model) refines the results from the first prediction model by improving the precision of the classification.

In some embodiments, the candidate prediction model may be a classification model (e.g., a machine learning model such as a random forest classifier, etc.) that is configured to classify each leaf tag as a candidate for one of the multiple payment options (e.g., two or more payment options). As discussed herein, the candidate prediction model is configured to make the classification prediction with high recalls such that the results may include a high number of false positives but a low number (or none) of false negatives. For example, the candidate prediction model may be configured to produce outputs having a false-negative rate below a predetermined threshold (e.g., 10%, 5%, 1%, etc.). In some embodiments, the candidate prediction model may be configured to produce such a result based on a training method, in which a substantially higher penalty is imposed to the candidate prediction model when the candidate prediction model makes a false negative classification error (e.g., classifying a leaf tag as a non-payment option when the leaf tag in fact corresponds to a payment option as negative) during training, and a substantially lower penalty is imposed to the candidate prediction model when the candidate prediction model makes a false positive classification error (e.g., classifying a leaf tag as a candidate for one of the multiple payment options when the leaf tag does not correspond to any payment option).

In some embodiments, the refined prediction model may be configured to take the output from the candidate prediction model (e.g., the candidate for one of the multiple payment options) and use a corresponding binary classifier to classify the leaf tag as positive (e.g., determining that the leaf tag corresponds to the one of the multiple payment options) or as negative (e.g., determining that the leaf tag does not correspond to any one of the multiple payment options). Thus, the refined prediction model may include multiple binary classifiers, each binary classifier corresponding to a different payment option. Based on the output from the candidate prediction model, the refined prediction model may classify the leaf tag using a binary classifier corresponding to the output. The refined prediction model may be configured to produce outputs having a false-positive rate lower than the outputs produced by the candidate prediction model by a threshold (e.g., 10%, 30%, 50%, etc.).

In some embodiments, both of the candidate prediction model and the refined prediction model analyzes the leaf tag and makes the predictions using one or more NLP-based techniques. For example, the position detection system may configure both of the candidate prediction model and refined prediction model to accept language attributes of the content in the leaf tag as input values for making the predictions. In some embodiments, the input values (e.g., feature) for the prediction models may include frequency counts of various n-grams (e.g., trigrams, 5-grams, etc.) of characters that appear in the content of the leaf tag. In some embodiments, the position detection system may obtain a corpus of various webpages (e.g., obtained by the web crawler) and may determine possible n-gram candidates (e.g., possible n number of contiguous characters) that appear in the corpus of webpages. For example, the position detection system may determine all n number of contiguous characters that appear in those webpages. With the wide variety of webpages that may be obtained by the web crawler, the list of all n number of contiguous characters (n-grams) (which in turn corresponds to the number of features in the prediction models) may be large. In one example, the position detection system has generated over 400,000 trigrams from the obtained webpages. As such, in order to improve the performance of the prediction models, in some embodiments, the position detection system may reduce the number of n-grams. For example, the position detection system may reduce the number of n-grams by eliminating n-grams that do not carry useful information in determining whether the leaf tag is a payment option or not (or which payment option associated with the leaf tag), by using an algorithm such as a chi-squared test. In one example, the position detection system may reduce the number of trigrams from over 400,000 to around 700. Each n-gram within the reduced list of n-grams corresponds to an input node to each of the prediction models.

When the position detection system analyzes a leaf tag, the position detection system may determine a count (e.g., a frequency) of each n-gram in the reduced list of n-grams that appears in the leaf tag. The counts (or frequencies) may be used as input values for the prediction models. In some embodiments, the position detection system may also modify the counts of at least some of the n-grams based on how common the n-grams are within the corpus of webpages. In some embodiments, the position detection system may reduce the count associated with an n-gram based on a frequency count of that n-count within the corpus (e.g., inverse proportion to the frequency count, etc.). In other words, the weight of such an n-gram is reduced when the n-gram is common within the corpus (the frequency count of that n-gram in the corpus is high). In some embodiments, the position detection system may modify the counts of the n-grams appeared in the webpage using a term frequency-inverse frequency (tf-idf) method.

The position detection system may then provide the counts (at least some of them may have been modified) of the n-grams as input values to the candidate prediction model. Based on the counts of the n-grams, the candidate prediction model may predict that the leaf tag corresponds to a candidate for a particular payment option among the multiple payment options (e.g., a particular payment option candidate such as a PayPal candidate, a PayPal Credit candidate, a VISA Credit candidate, a VISA debit candidate, an Apple Pay candidate, etc.) or that the leaf tag does not correspond to any one of the payment options. It is conceivable that the candidate prediction model will determine that most of the leaf tags do not correspond to any one of the payment option (due to the heavy class imbalance). Furthermore, based on the way that the candidate prediction model was trained (e.g., to focus on recall at the cost of precision), the candidate prediction model would correctly classify most or all (e.g., above a threshold such as 80%, 90%, 98%) of the leaf tags that in fact correspond to the predicted payment option, even though the candidate prediction model would produce some false positives.

The position detection system may then provide the same input values (e.g., the counts of the n-grams) and the output obtained from the candidate prediction model to the refined prediction model. In some embodiments, the refined prediction model may be trained to prevent both false positives and false negatives more equally than the candidate prediction model, such that the refined prediction model may be configured to produce more accurate prediction than the candidate prediction model (thus, refining the results from the candidate prediction model). Based on the output from the candidate prediction model (e.g., the particular payment option candidate), the refined prediction model may select and use a binary classifier corresponding to the particular payment option candidate to classify the leaf tag as positive (e.g., that the leaf tag corresponds to the particular payment option) or negative (e.g., that the leaf tag does not correspond to the particular payment option).

For those leaf tags that have been identified to correspond to payment options by both of the prediction models, the position detection system may analyze the relative locations of those leaf tags in the programming code (e.g., by using the DOM tree) to determine the relative positions of each of the payment options on the webpage when the webpage is rendered on a display device. Thus, using this two-step approach, the position detection system may identify all of the webpage elements within the webpage that corresponds to the various payment options, and may determine a relative position of any particular payment options in the webpage. The position detection system may provide the results to another system or module of the online service provider for taking an action on the webpage or transactions that are conducted through the webpage. For example, the online service provider may submit a notification to a host of the webpage based on the results. In another example, the online service provider may process transactions conducted through the webpage based on the results (e.g., increasing or reducing a risk level associated with the transaction).

For example, the position detection system may determine whether the relative position of a particular payment option (e.g., a PayPal option) among the group of payment options corresponds to a predetermined position (e.g., a position that was agreed upon by the merchant associated with the webpage or a desirable position by the particular payment service provider associated with the position detection system). If the position detection system determines that the position of the particular payment option is different (e.g., higher or lower) than the predetermined position, the position detection system may transmit an alert to a device associated with the service provider. In some embodiments, as discussed above, the web crawler may be configured to crawl through a network (e.g., the Internet) to obtain various webpages associated with different entities (e.g., transaction checkout webpages associated with different merchant websites). The position detection system may then analyze the programming code of the webpages to determine, for each merchant website, a relative position of the particular payment option among the group of payment options. The position detection system may generate a report indicating the merchant websites that present the particular payment option at the predetermined position and the merchant websites that present the particular payment option at a different position. Furthermore, the position detection system may also determine correlations between the relative position of the payment option and a metric that may be a number (or frequency), a ratio, or other metrics of transactions for which the end-users select the particular payment option for the transactions. In some embodiments, the position detection system may feed the data into a machine learning model to determine an optimal position (e.g., the position of the payment option that would produce the maximum number of selection of the particular payment option).

In some embodiments, the position detection system is part of a risk assessment system for a service provider. In some embodiments, the particular webpage element may be associated with initiating an electronic transaction request with the service provider (e.g., initiating an electronic payment request, etc.). Thus, when an end user selects the particular webpage element (e.g., a button, a link, etc.) that appears on the webpage (e.g., a transaction checkout webpage), the web browser directs the end user to a website associated with the service provider. The risk assessment system of the service provider may then use the position detection system to determine a relative position of the particular payment option among the group of related webpage elements that appear on the transaction checkout webpage when the transaction checkout webpage is rendered and may use the determined relative position to determine a risk associated with the transaction request. The risk assessment system may authorize or deny the transaction request based on the risk.

FIG. 1 illustrates an electronic transaction system 100, within which the position detection system may be implemented according to one embodiment of the disclosure. The electronic transaction system 100 includes a service provider server 130, merchant servers 120, 170, and 180, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant servers 120, 170, and 180, and/or the service provider server 130 over the network 160. For example, the user 140 may use the user device 110 to conduct an online purchase transaction with any one of the merchant servers 120, 170, and 180 via websites hosted by, or mobile applications associated with, the merchant servers 120, 170, and 180, respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with the merchant servers 120, 170, and 180, and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or the merchant servers 120, 170, and 180 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, when the a transaction checkout webpage associated with any one of the merchant servers 120, 170, or 180 (that includes a group of website elements, such as links to different service provider servers including the service provider server 130) is presented on the UI application 112 of the user device 110, the user 140 may use the input component to provide a selection of any one of the website elements presented on the transaction checkout webpage. Furthermore, the user 140 may also use the input component to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. In one example, the marketplace application 122 may include an interface server (e.g., a web server, a mobile application server, etc.) that provides an interface (e.g., a webpage) for the user 140 to interact with the merchant server 120. The merchant web site hosted by the merchant server 120 may include a transaction checkout webpage, which may include webpage elements (e.g., links, etc.) for initiating payment services with the service provider server 130 and possibly other service providers. The user 140 who initiates a transaction with the merchant server 120 may be presented with such a transaction checkout webpage, through which the user 140 may select a payment method with any one of the payment service providers (e.g., via selecting one of the webpage elements on the webpage). The merchant may also have an account with the service provider server 130. Each of the merchant servers 170 and 180 may include similar components as the merchant server 120 and may provide similar services to the user 140 as the merchant server 120.

In some embodiments, each of the merchant servers 170 and 180 may be associated with different merchants and implemented in a way similar to the merchant server 120. Furthermore, each of the merchant servers 170 and 180 may include similar components as the merchant server 120 as described above.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the profile matching module 132 to match profiles to the entity. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a position detection module 132 that implements the position detection system as discussed herein. The position detection module 132 is configured to determine a relative position of an appearance of a particular webpage element (e.g., which corresponds to a particular payment option) within a webpage (e.g., hosted by anyone of the merchant servers 120, 170, and 180) when the webpage is rendered. For example, the position detection module 132 may obtain a webpage from any one of the merchant servers 120, 170, or 180, and may analyze the programming code of the webpage. Based on the analyzing of the programming code, the position detection module 132 may determine a relative position of an appearance of a particular webpage element (e.g., a link associated with the service provider server 130 such as a PayPal payment option) among related webpage elements (e.g., links associated with other similar service provider servers such as other payment options) when the webpage is rendered. The position detection module 132 may transmit alerts to the service provider server 130 based on the determined position (e.g., when the determined position is different from a predetermined position for the particular webpage element). The position detection module 132 may also determine correlations between positions of an appearance of the particular webpage element and certain web-related metrics, such as a hit ratio of the particular webpage element, a usage ratio of the service provider server 130, etc. Furthermore, when the particular webpage element is associated with initiating a transaction request with the service provider server 130, the position detection module 132 may also use the determined position to assess a risk of the transaction request, and to facilitate a decision by the service provider 130 to authorize or deny the transaction request.

Figure 2:
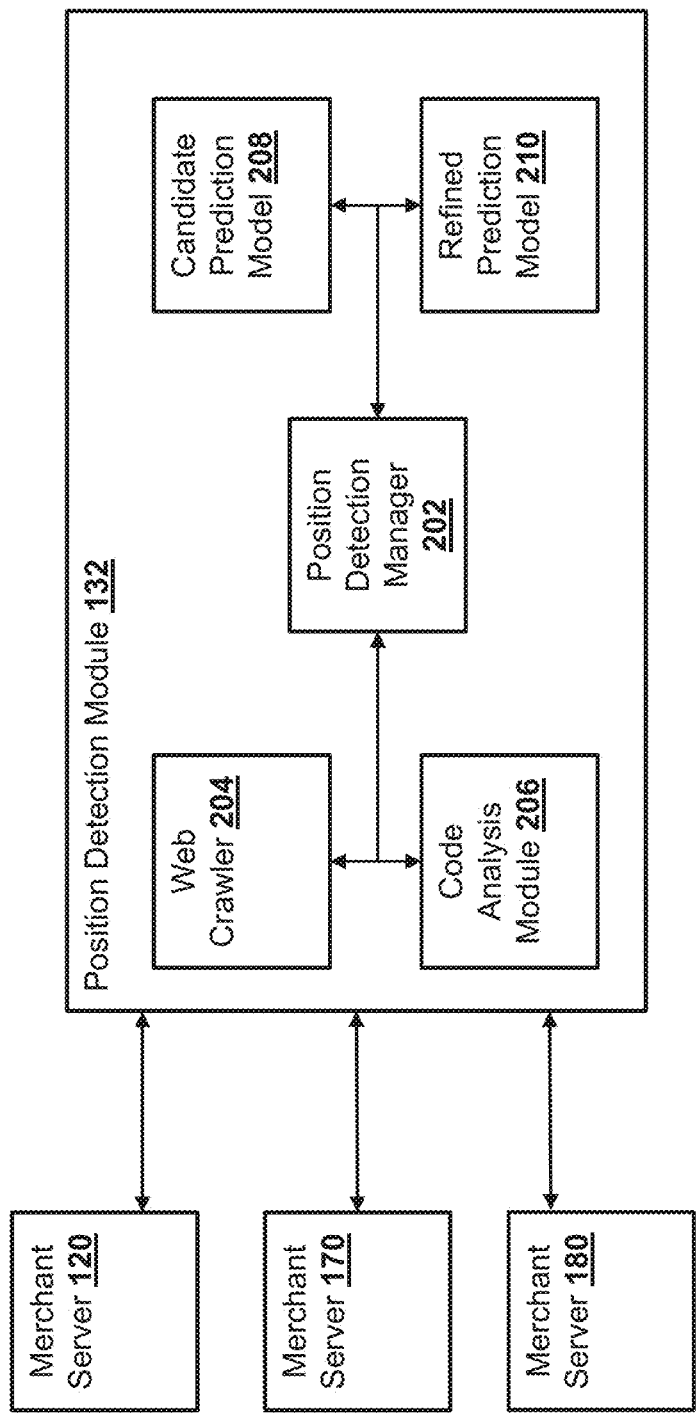
FIG. 2 is a block diagram illustrating a position detection module according to an embodiment of the present disclosure.

FIG. 2 illustrates a block diagram of the position detection module 132 according to an embodiment of the disclosure. The position detection module 132 includes a position detection manager 202, a web crawler 204, a code analysis module 206, a candidate prediction model 208, and a refined prediction model 210. The position detection manager 202 may use the web crawler 204 to access webpages that may include a particular webpage element (e.g., a link to the service provider server 130 for submitting a request for performing electronic transactions). For example, if the particular webpage element is a payment option link associated with the service provider server 130, the web crawler 204 may access various merchant websites via the network 160 (such as merchant websites associated with the merchant servers 120, 170, and 180), and may emulate an end user (e.g., a human user) initiating a transaction with the merchant website by selecting one or more offerings from the merchant website for purchase and initiating a checkout process with the merchant website. Once the web crawler 204 accesses the webpage that includes the particular webpage element (e.g., a transaction checkout webpage of a merchant website that includes a link to the service provider server 130), the web crawler 204 may obtain (e.g., downloads) source programming code of the webpage.

The position detection module 132 may then analyze the webpage using one or more graph-based and NLP-based techniques disclosed herein to determine whether the webpage includes a group of related web elements corresponding to payment options, and a relative position of a particular payment option. In some embodiments, the code analysis module 206 may generate a DOM tree based on the programming code of the webpage. By traversing the DOM tree, the code analysis module 206 may identify multiple leaf tags that correspond to web elements on the webpage that are related to each other. These leaf tags may or may not be associated with the service provider server 130 (e.g., may or may not be a link for requesting a transaction with the service provider server 130, such as a payment option link). In some embodiments, the code analysis module 206 may use one or more NLP-based techniques to analyze the content of the leaf tags on a character basis. For example, the code analysis module 206 may generate analysis data such as frequency counts of different n-grams that appear in the content of a leaf tag. The analysis data may then be fed into the candidate prediction model 208 and the refined prediction model 210 to determine whether the leaf tag corresponds to a particular payment option. In some embodiments, the candidate prediction model 208 may be configured to classify, for a leaf tag, whether the leaf tag is a candidate for a particular one of the payment options or does not correspond to any payment option. As discussed herein, the classifications performed by the candidate prediction model 208 may be coarse (e.g., having a high false positive rate above a threshold such as 30%, 50%, etc.). Thus, when a leaf tag is classified as a candidate for a particular one of the payment options, the position detection manager 202 may use the refined prediction model 210 to perform a refined prediction on whether the leaf tag corresponds to the particular payment option or not. Details on how each of the components within the position detection module 132 operate to determine a relative position of a particular payment option within a webpage will be described in more details below by reference to FIG. 3.

Figure 3:
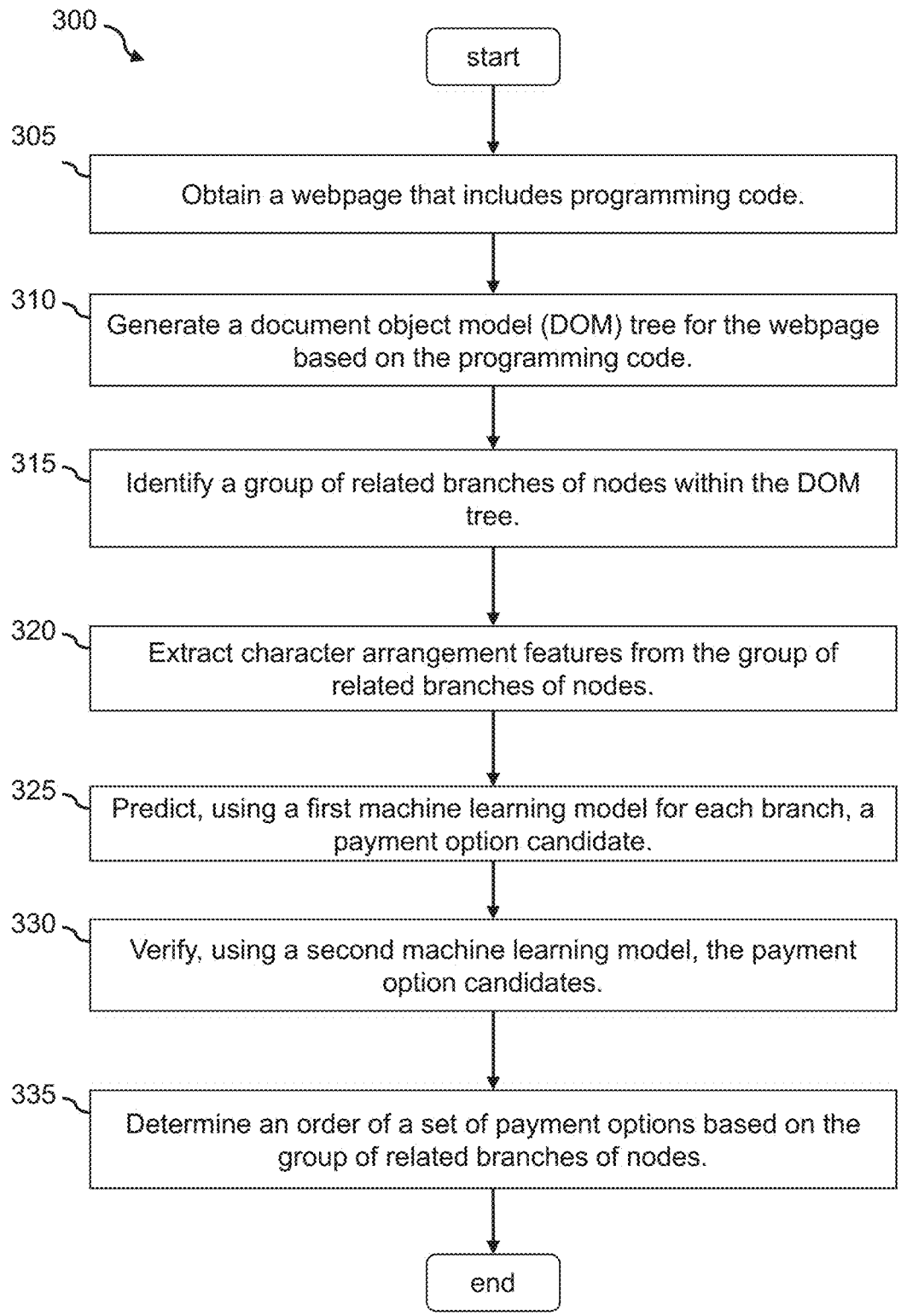
FIG. 3 is a flowchart showing a process of automatically detecting positions of webpage elements within a webpage according to an embodiment of the present disclosure.

FIG. 3 illustrates a process 300 for determining a relative position of an appearance of a particular webpage element (e.g., a particular payment option) among related webpage elements within a webpage when the webpage is rendered according to various embodiments of the disclosure. In some embodiments, at least a portion of the process 300 may be performed by the position detection module 132 of the service provider server 130. The process 300 begins by obtaining (at step 305) a webpage that includes programming code. For example, the position detection manager 202 may use the web crawler 204 to access different webpages by traversing a list of network addresses (e.g., uniform resource locator (URL) addresses, etc.) associated with different merchants, such as different webpages hosted by the merchant servers 120, 170, and 180. In some embodiments, the web crawler 204 may access a transaction checkout webpage (that may include a list of payment options) by initiating a transaction checkout process at a merchant website. In some embodiments, the web crawler 204 may emulate an end-user initiating a transaction with the merchant website. The web crawler 204 may first access the merchant website (e.g., a homepage or a portal of the merchant website), arbitrarily select one or more offerings from the merchant website for purchase (e.g., by adding the one or more offerings to an electronic shopping cart of the merchant website), and then initiate the checkout process via the merchant website (e.g., selecting a checkout option on the merchant website) to access a transaction checkout page of the merchant website.

Figure 4:
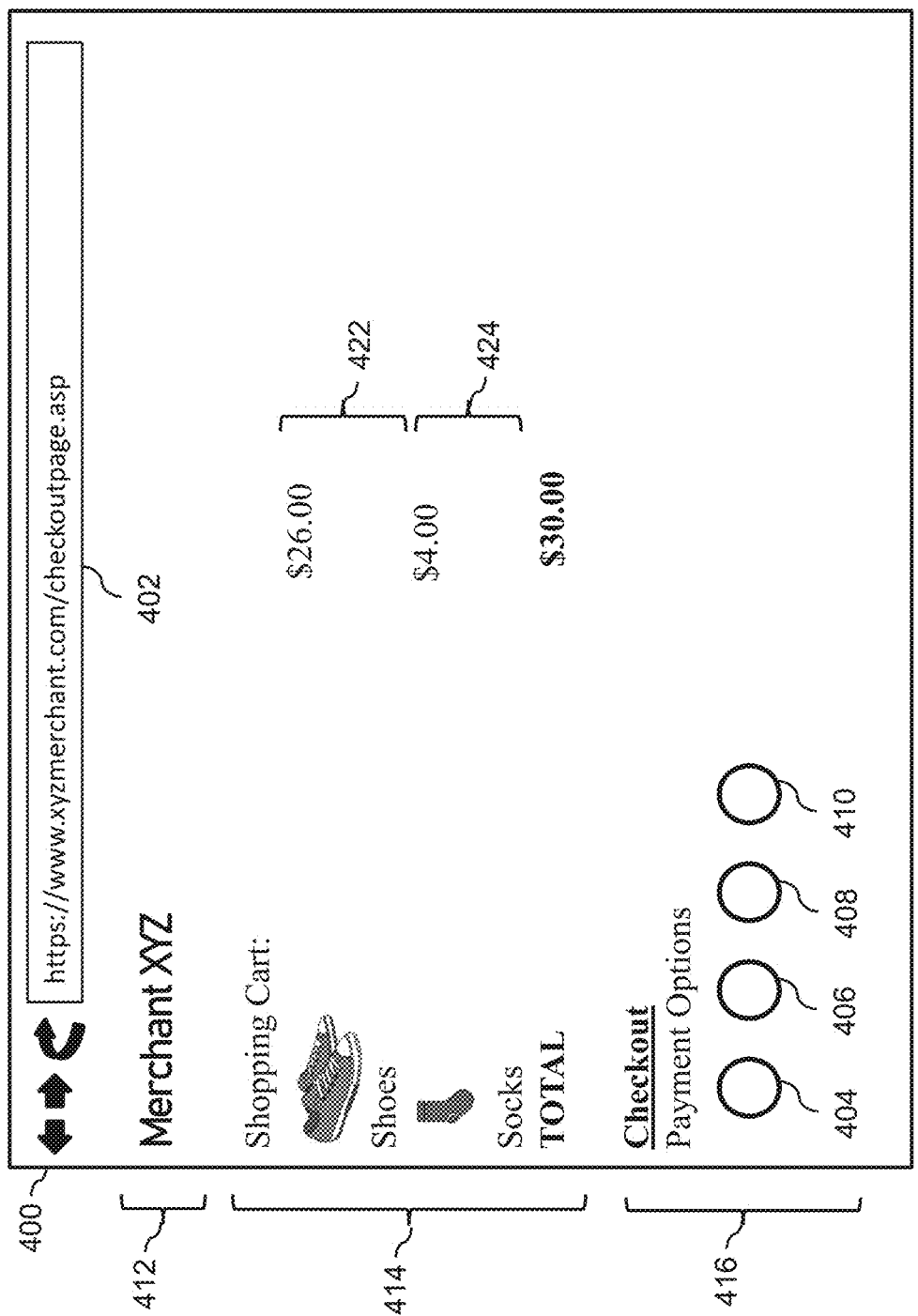
FIG. 4 illustrates an exemplary webpage having groups of related webpage elements according to an embodiment of the present disclosure.

FIG. 4 illustrates an example webpage 400 accessed by the web crawler 204. In this example, the webpage 400 is a transaction checkout webpage associated with a merchant called 'XYZ,' as indicated by the network address 402 associated with the webpage 400. The webpage 400 may be associated with one of the merchant servers 120, 170, and 180. As shown, the webpage 400 includes a merchant logo 412 associated with the merchant, a transaction summary section 414, and a payment option section 416. The transaction summary section 414 in this example includes webpage elements 422 and 424, which show that the transaction is for a purchase of a pair of shoes that costs $26 and a pair of socks that costs $4, which brings the total of the transaction to be $30. In the payment option section 416, multiple webpage elements 404-410 are presented. Each of the webpage elements 404-410 may correspond to a payment option (e.g., a link to initiate a payment transaction service with a corresponding payment service provider). In this example, the webpage element 406 (the particular webpage element) may be a link to initiate a payment transaction service with the service provider server 130 (e.g., a PayPal payment option), while the webpage elements 404, 408, and 410 may be links to initiate a payment transaction service with other service provider servers (e.g., different from the service provider server 130 such as an Apple Pay payment option, a VISA credit card payment option, an American Express credit card payment option, etc.). By rendering the webpage 400 on a display device, it may be easy, but time-consuming, for a human to determine a position of a particular webpage element 406 (e.g., the particular payment option) by observing the presentation of the webpage 400. However, as indicated above, it can be challenging for a machine to automatically identify various webpage elements and determine their positions on the webpage.

Thus, according to various embodiments of the disclosure, the position detection module 132 may analyze the programming code associated with the webpage using the graph-based and NLP-based techniques to identify various webpage elements associated with different payment options within the webpage. In some embodiments, the position detection manager 202 may obtain programming code associated with the webpage 400 (e.g., by downloading the source code of the transaction checkout webpage 400). The code analysis module 206 may analyze the programming code associated with the webpage 400 to identify one or more groups of related webpage elements within the webpage 400 (referred to as "leaf tags") based on the programming structure of the webpage elements (the webpage elements that are related to each other usually share similar programming structure). In this example, the webpage 400 may include at least two groups of displayable related web elements: a first group that includes the webpage elements 422 and 424 and a second group that includes the webpage elements 404-410.

FIG. 5 illustrates a portion of the programming code 500 associated with the webpage 400. Specifically, the portion of the programming code 500 corresponds to the webpage elements 406 and 408 of the webpage 400. A person skilled in the art would appreciate that the webpage 400 includes additional programming code other than what is illustrated in FIG. 5. As shown in FIG. 5, the programming code 500 includes a code portion 506 that corresponds to the webpage element 406 (e.g., a PayPal payment option) and a code portion 508 that corresponds to the webpage element 408 (e.g., an Apple Pay payment option) as an illustration to show the programming structures of website elements that are related to each other. First, both the code portions 506 and 508 include the same programming structure, which includes an <input> tag and a <label> tag being nested within a <div> tag, which in turn is nested within another <div> tag. Second, the code portions 506 and 508 are both nested on the same nesting level within the programming code 500.

In some embodiments, the code analysis module 206 may use one or more graph-based techniques to analyze the programming code to identify related web elements (also referred to as "leaf tags") in the webpage 400. Specifically, the code analysis module 206 may generate a document object model (DOM) tree for the webpage 400 based on the programming code of the webpage 400 and may identify leaf tags within the DOM tree.

Referring back to FIG. 3, the process 300 generates (at step 310) a document object model (DOM) tree for the webpage based on the programming code. A DOM tree is a computer platform and programming language independent structure that represents webpage elements within a webpage as a tree structure. The DOM tree may include nodes, where a node (or a group of nodes) in the DOM tree corresponds to a webpage element or a sub-element within the webpage (e.g., the tags and/or attributes associated with the webpage element). For example, the root node (or the root group of nodes) in the DOM tree may correspond to a root tag (e.g., the <html> tag) within the webpage. As webpage elements and sub-elements may be nested within other webpage elements within the programming code structure of the webpage, the DOM tree that is generated based on the programming code of the webpage may represent the different levels of nesting of webpage elements and sub-elements within the webpage as different levels of nodes, where each level within the DOM tree structure corresponds to a nesting level (e.g., tag level) within the programming code. Thus, when the webpage has a nested structure (e.g., one or more nested tags), the position detection system may generate the DOM tree to have multiple levels, where each nested structure is represented by a level within the DOM tree. As such, the DOM tree may represent how the webpage elements (e.g., text, images, multi-media content, user interface elements such as a link, a button, a check-box, a text box, a radio button, etc.) are presented when the webpage is rendered by a software application (e.g., a web browser).

Figure 6:
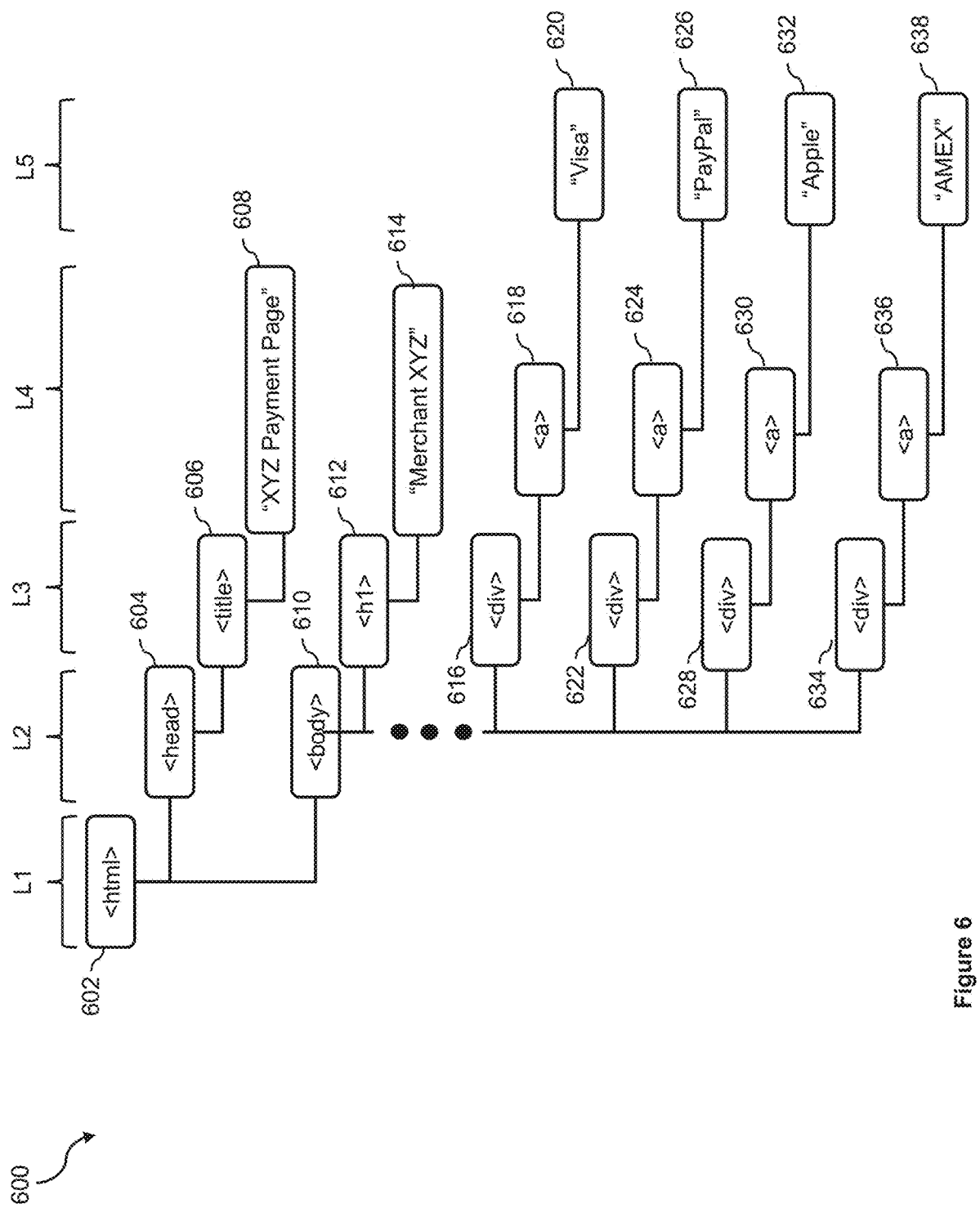
FIG. 6 illustrates exemplary DOM tree generated based on programming code associated with a webpage according to an embodiment of the present disclosure.

FIG. 6 illustrates an example DOM tree 600 that is generated by the code analysis module 206 based on the programming code 500 of the webpage 400. As shown, the DOM tree 600 includes a root node 602 that corresponds to an <html> tag in the programming code 500. The root node 602 is the only node that resides in the top level (Level 1) of the DOM tree 600. Since all the tags within the programming code 500 are nested within the <html> tag, all remaining nodes in the DOM tree 600 representing the remaining tags in the programming code 500 are nested beneath one or more levels of the root node 602. For example, since a <head> tag and a <body> tag is nested within the <html> tag within the programming code 500, the DOM tree 600 includes nodes 604 and 610, which represent the <head> tag and the <body> tag, respectively, in the second level (Level 2).

Underneath the node 604, the DOM tree 600 includes node 606 in Level 3 and node 608 in Level 4, representing the <title> tag that is nested within the <head> tag and the actual title text "XYZ Merchant Page" that is nested within the <title> tag in the programming code 500, respectively. Underneath the node 610 that represents the <body> tag, the DOM tree 600 includes multiple nodes that represent most of the displayable content of the webpage 400. For example, the DOM tree 600 includes node 612, representing the <h1> tag and node 614 representing the text "Merchant XYZ" that is displayed on the webpage 400 (corresponding to the title of the webpage 412). The DOM tree 600 may also include other nodes (not shown) representing other displayable webpage elements of the webpage 400, such as elements 422 and 424. Furthermore, the DOM tree 600 includes nodes 616-638 (in Level 3, Level 4, and Level 5), representing webpage elements 404-410 of the webpage 400.

Returning to FIG. 3, the process 300 then identifies (at step 315) a group of related branches of nodes (also referred to as "leaf tags") within the DOM tree. For example, the code analysis module 206 may perform one or more graph-based analyses to identify leaf tags in the DOM tree 600. A leaf tag may include a node or a branch of nodes that may be related to one or more other leaf tags (e.g., sibling leaf tags). As related webpage elements usually follow a particular programming code structure element that is similar among each other and are nested within the same level (e.g., siblings) within the programming code (and usually on the lower level(s) of the tree such as the leaf node level), the code analysis module 206 of some embodiments may identify the set of leaf tags that (i) are within the same level within the DOM tree structure 600 having a common parent node and (ii) share particular programming code structures that follow predetermined patterns.

To enhance the speed of identifying the leaf tags, the code analysis module 206 of some embodiments may pre-process the DOM tree 600 to remove irrelevant nodes and/or irrelevant data within the nodes. For example, the code analysis module 206 may remove any nodes that are deemed to be irrelevant to the payment options based on the tags included in the nodes. In some embodiments, the code analysis module 206 may remove any nodes and their descendant nodes in the DOM tree when the node includes a tag from the following exclusion list of tags: a <title> tag, a <script> tag, a <noscript> tag, a <meta> tag, a <link> tag, a <style> tag, a <font> tag, and a <svg> tag, since nodes with these tags do not correspond to payment options. The code analysis module 206 may also remove certain inline tags from the nodes (but not removing the nodes and other content of the nodes) that are deemed to be irrelevant to the determination of whether a node is associated with a payment option or not. For example, the code analysis module 206 may remove any inline tags from the nodes (but keeping the rest of the content and their descendent nodes) such as an <abbr> tag, an <acronym> tag, a <b> tag, a <bdo> tag, a <big> tag, a <br> tag, a <cite> tag, a <code> tag, a <dfn> tag, an <em> tag, an <i> tag, an <kbd> tag, an <output> tag, a <q> tag, a <samp> tag, a <small> tag, a <span> tag, and a <strong> tag. In particular, the code analysis module 206 may retain, in the nodes, inline tags that are deemed relevant to the determination of whether a node is associated with a payment option, such as an <a> tag, a <button> tag, an <img> tag, an <input> tag, a <label> tag, a <script> tag, and a <select> tag.

After pre-processing the nodes in the DOM tree 600, the code analysis module 206 may then traverse the nodes in the DOM tree 600 according to a depth-first-search order to identify any nodes and/or branches of nodes as leaf tags. In some embodiments, while traversing the nodes in the DOM tree, the code analysis module 206 may identify any node that is either a leaf node or that includes a relevant tag for determining whether the node is associated with a payment option (e.g., a tag that is part of a set of predefined tags including <a> tag, an <iframe> tag, an <img> tag, an <input> tag, and a <button> tag) as a leaf tag. If it is determined that the identified node (e.g., the leaf node) includes only displayable text (e.g., not having any HTML tags), the code analysis module 206 may include the parent node and its descendant nodes (the branch of nodes having the parent node as the root node) in the leaf tag. For example, when the code analysis module 206 reaches the leaf node 620, the code analysis module 206 may include its parent node 618 in the leaf tag since the node 620 only includes text data.

It is also common for the programming code that represents a payment option to have nested webpage elements due to the programmatic nature of the generation of webpage programming code (e.g., HyperText Markup Language). For example, a webpage element that includes only text associated with the payment option may be nested within a hyperlink webpage element (e.g., indicated by an <a> tag) for linking to a payment service provider server (e.g., the service provider server 130) associated with the payment option, which in turn may be nested within one or more division webpage elements (e.g., indicated by a <div> tag). Referring to the DOM tree 600 in FIG. 6, the leaf node 620, representing the text "Visa" is nested within the leaf node 618, representing the <a> tag, which in turn is nested within the leaf node 616, representing the <div> tag.

When a list of related webpage elements (e.g., a list of payment options) is included in a webpage, the webpage elements (multiple of them) would be implemented within the same level in the DOM tree structure under the same parent node. In this example, the related webpage elements 404-410 are represented in the DOM tree 600 as groups of nodes, including a first group of nodes 616-620 representing the webpage element 404, a second group of nodes 622-626, representing the webpage element 406, a third group of nodes 628-632, representing the webpage element 408, and a fourth group of nodes 634-638, representing the webpage element 410. These groups of nodes (each group may be identified as a leaf tag by the code analysis module 206) share the same parent node 610.

Thus, when the code analysis module 206 reaches a node (e.g., the node 618 representing the hyperlink webpage element) that may be identified as a leaf tag based on the criteria discussed above, the code analysis module 206 may determine whether the node (or the branch of nodes 618-620) has any siblings (e.g., other nodes or branches of nodes in the same level of the DOM tree 600 that share the same parent node). If it is determined that the node (or the branch of nodes) has one or more siblings within the DOM tree, the code analysis module 206 may classify the node (or the branch of nodes) and its siblings as leaf tags. On the other hand, if it is determined that the node (or the branch of nodes) has no siblings within the DOM tree, the code analysis module 206 may iteratively traverse upward to a parent node (e.g., to the node that represents the division webpage element) until it is determined that the branch of node (including the parent node) has one or more siblings, in which case, the position detection system may classify the branch of node (including the parent node) and its siblings as leaf tags. In the case where the position detection system reaches the root node of the DOM tree, the position detection system may ignore that branch of nodes and continue to traverse the next branch in the DOM tree.

Using the example discussed herein, the code analysis module 206 may determine that the branch of node that includes nodes 618-620 has no siblings (e.g., no other branch of nodes in Level 4 having the same parent node 616). Thus, the code analysis module 206 may traverse upward to a parent node (e.g., the node 616), and determines whether the branch of node that includes nodes 616-620 has any siblings. The code analysis module 206 may determine that the branch of nodes 616-620 has several siblings that share the parent node 610, including the branch of nodes 622-626, the branch of nodes 628-632, and the branch of nodes 634-638. Thus, the code analysis module 206 may identify all of these branches of nodes, including the branch of nodes 616-620, the branch of nodes 622-626, the branch of nodes 628-632, and the branch of nodes 634-638 as leaf tags.

Once the code analysis module 206 determines a set of leaf tags based on analyzing the DOM tree using the techniques described herein, the position detection module 132 of some embodiments may analyze the leaf tags to determine whether each of the leaf tag in the set of leaf tags correspond to a payment option, and if so, which particular payment option is associated with the leaf tag using one or more NLP-based techniques. In some embodiments, to enhance the speed of analyzing the leaf tags, the position detection manager 202 may apply a cleansing process to the leaf tags to eliminate data irrelevant to the determination process. The cleansing process may include, for any node in the set of leaf tags, removing any protocol, query string, and any directory except the last directory referenced in any uniform resource locator (URL) referencing attributes. For example, the position detection manager 202 may identify any attribute values corresponding to URL referencing attributes, such as a <href> tag, a <src> tag, etc. The position detection manager 202 may remove, from the identified attribute value any protocol or query string (e.g., the portion of the attribute value after a "?" character). The position detection manager 202 may also remove all folders referenced in the attribute value except the last one (the folder that stores the webpage). Thus, the position detection manager 202 will turn a URL attribute value of "https://assets.secure.checkout.visa.com/wallet-services-web/xo/button.png?color=neutral&cobrand=false&svg=true&legacy=true" to "assets.secure.checkout.visa.com/button".

In some embodiments, the cleansing process may also include removing any attributes in the nodes except the following set of attributes: 'name,' 'class,' 'id,' 'title,' 'alt,' 'value,' src,' and 'href'. The cleansing process may also include removing multiple spaces and new line. The cleansing process may also turn all characters in the attributes to either uppercase or lowercase. Furthermore, the cleansing process may include removing any node that has content exceeding a threshold (e.g., 1,200 characters).

Thus, for a leaf tag that includes the following data:

```
"<div class= "checkout-paypal-button-container" title="">
    <a href=
"paypal.com/web/merchant/trans/process?storeId=7201&orderId=11591314&callSource=Express;cancelURL=https%3a%2fiaslkjfa;lskjfalskjcn;w.js" class="billing-paypalbutton billing-paypal-button-js ">
        <img src= "www.paypalobjects.com/webstatic/en_US/i/buttons/checkout-logo-large.png alt= "Check out with PayPal">
    </a>
</div>"
```

The position detection manager 202 may transfer into:

```
<div class= "checkout-paypal-button-container">
    <a class= "billing-paypal-button billing-paypal-button-js" href=
    "paypal.com/process">
    <img alt= "check out with paypal" src=
    www.paypalobjects.com/checkout-logo-large />
    </a>
</div>
```

The cleansed leaf tags may then be analyzed by the position detection module 132. In some embodiments, the position detection module 132 may use a two-step approach in analyzing the leaf tags, to determine whether a leaf tag corresponds to a payment option and which payment option the leaf tag is associated with. Since many of the webpages obtained by the position detection system may not be a merchant checkout page, and even within a merchant checkout page, most of the leaf tags may not correspond to a payment option (e.g., may correspond to the group of webpage elements 422-424 or other elements, such as a menu, etc.), the classification of leaf tag has a heavy class imbalance (e.g., majority of the leaf tags will not correspond to a payment option). Thus, according to some embodiments of the disclosure, the position detection module 132 may use two different, but coordinated, prediction models to make the classification prediction, where the first prediction model (e.g., a candidate prediction model 208) focuses on recall (e.g., identifying as many positive leaf tags as possible at the cost of low precision) and the second prediction model (e.g., a refined prediction model 210) refines the results from the first prediction model by improving the precision of the classification.

In some embodiments, both of the candidate prediction model 208 and the refined prediction model 210 analyzes the leaf tag and makes the predictions using one or more NLP-based techniques. For example, both of the candidate prediction model 208 and refined prediction model 210 are configured to accept language attributes of the content in the leaf tag as input values for making the predictions. In some embodiments, the input values (e.g., feature) for the prediction models may include frequency counts of various n-grams (e.g., trigrams, 5-grams, etc.) of characters that appear in the content of the leaf tag. In some embodiments, the position detection module 132 may obtain a corpus of various webpages (e.g., obtained by the web crawler) and may determine possible n-gram candidates (e.g., possible n number of contiguous characters) that appear in the corpus of webpages. For example, the position detection module 132 may determine all n number of contiguous characters that appear in those webpages. With the wide variety of webpages that may be obtained by the web crawler, the list of all n number of contiguous characters (n-grams) (which in turn corresponds to the number of features in the prediction models) may be large. In one example, the position detection module 132 has generated over 400,000 trigrams from the obtained webpages. As such, in order to improve the performance of the prediction models, in some embodiments, the position detection module 132 may reduce the number of n-grams. For example, the position detection system may reduce the number of n-grams by eliminating n-grams that do not carry useful information in determining whether the leaf tag is a payment option or not (or which payment option associated with the leaf tag), by using an algorithm such as a chi-squared test. Each n-gram within the reduced list of n-grams corresponds to an input node to each of the prediction models.

Referring back to FIG. 3, the process 300 then extracts (at step 320) character arrangement features from the group of related branches of nodes. For example, the position detection manager 202 may, for each identified leaf tag, determine a count (e.g., a frequency) of each n-gram in the reduced list of n-grams that appears in the leaf tag. The counts (or frequencies) may be used as input values for the prediction models. In some embodiments, the position detection manager 202 may also modify the counts of at least some of the n-grams based on how common the n-grams are within the corpus of webpages (the more common an n-gram is within the corpus, the less effective it is as an indicator for determining whether the leaf tag corresponds to a particular payment option). In some embodiments, the position detection manager 202 may reduce the count associated with an n-gram based on a frequency count of that n-count within the corpus (e.g., inverse proportion to the frequency count, etc.). In other words, the weight of such an n-gram is reduced when the n-gram is common within the corpus (the frequency count of that n-gram in the corpus is high). In some embodiments, the position detection manager 202 may modify the counts of the n-grams appeared in the webpage using a term frequency-inverse frequency (tf-idf) method.

The process 300 then predicts (at step 325), using the first machine learning model for each branch, a payment option candidate. In some embodiments, the online service provider may have knowledge of multiple different payment options (some of the payment options may be associated with the same or different payment service providers), including the payment option(s) associated with the service provider server 130 (e.g., PayPal). The position detection module 132 may have trained the candidate prediction model 208 to classify leaf tags as one of the known payment options using historic data (e.g., each training data may have been labeled with a payment option identifier).

In some embodiments, the candidate prediction model 208 may be a classification model (e.g., a machine learning model such as a random forest classifier, etc.) that is configured to classify each leaf tag as a candidate for one of the known payment options. As discussed herein, the candidate prediction model 208 may be configured to make the classification prediction with high recalls such that the results may include a high number of false positives but a low number (or none) of false negatives. For example, the candidate prediction model 208 may be configured to produce outputs having a false-negative rate below a predetermined threshold (e.g., 10%, 5%, 1%, etc.). In some embodiments, the candidate prediction model 208 may be configured to produce such a result based on a training method, in which a substantially higher penalty is imposed to the candidate prediction model when the candidate prediction model makes a false negative classification error (e.g., classifying a leaf tag as a non-payment option when the leaf tag in fact corresponds to a payment option as negative), and a substantially lower penalty is imposed to the candidate prediction model when the candidate prediction model makes a false positive classification error (e.g., classifying a leaf tag as a candidate for one of the multiple payment options when the leaf tag does not correspond to any payment option) during training.

The position detection manager 202 may provide the counts (at least some of them may have been modified) of the n-grams as input values to the candidate prediction model 208. Based on the counts of the n-grams, the candidate prediction model 208 may predict that the leaf tag corresponds to a candidate for one of the multiple payment options (e.g., a particular payment option candidate such as a PayPal candidate, a PayPal Credit candidate, a VISA candidate, an Apple Pay candidate, etc.) or that the leaf tag does not correspond to any one of the payment options. For example, the position detection manager 202 may determine counts of various n-grams within the content of the leaf tag comprising the branch of nodes 616-620 (e.g., the cleansed content). The position detection manager 202 may then provide the counts as input values to the candidate prediction model 208. Based on the counts, the candidate prediction model 208 may predict that the branch of nodes 616-620 is a candidate for a VISA payment option. The position detection manager 202 may also determine counts of various n-grams within the content of the leaf tag comprising the branch of nodes 622-626 (e.g., the cleansed content). The position detection manager 202 may then provide the counts as input values to the candidate prediction model 208. Based on the counts, the candidate prediction model 208 may predict that the branch of nodes 622-626 is a candidate for a PayPal payment option. As discussed herein, the results from the candidate prediction model 208 are overly inclusive to prevent false negative outcomes.

The process 300 then verifies (at step 330), using a second machine learning model, the payment option candidates. In some embodiments, the second machine learning model is a refined prediction model (e.g., the refined prediction model 210). The refined prediction model 210 may include multiple binary classifiers (each may be a separate machine learning model), where each binary classifier corresponds to a particular known payment option (e.g., VISA, PayPal, Apple Pay, etc.). Each of the binary classifiers is trained specifically to classify a leaf tag as positive (e.g., the leaf tag is associated with the corresponding payment option) or as negative (e.g., the leaf tag is not associated with the corresponding payment option). By having a dedicated binary classifier for each payment option, the refined prediction model 210 can make predictions with higher accuracy. The refined prediction model 210 may be configured to produce outputs having a false-positive rate lower than the outputs produced by the candidate prediction model 208 by a threshold (e.g., 10%, 30%, 50%, etc.).

In some embodiments, the refined prediction model 210 is configured to take the output from the candidate prediction model 208 (e.g., the candidate for one of the multiple payment options) and select the corresponding binary classifier to classify the leaf tag. The binary classifier may be provided with the counts of the various n-grams as input values, and produce an outcome, which may be either a positive outcome (e.g., determining that the leaf tag is associated with the corresponding payment option) or a negative outcome (e.g., determining that the leaf tag is not associated with the corresponding payment option).

For example, for the leaf tag that includes the branch of nodes 616-620, the position detection manager 202 may provide an indication that the leaf tag is associated with the VISA payment option and the counts of the various n-grams as input values to the refined prediction model 210. Based on the indication, the refined prediction model 210 may select a binary classifier corresponding to the VISA payment option. The refined prediction model 210 may then use the binary classifier to classify the leaf tag as positive or negative based on the counts. In this example, the binary classifier may classify the leaf tag as being associated with the VISA payment option. For the leaf tag that includes the branch of nodes 622-626, the position detection manager 202 may provide an indication that the leaf tag is associated with the PayPal payment option and the counts of the various n-grams as input values to the refined prediction model 210. Based on the indication, the refined prediction model 210 may select a binary classifier corresponding to the PayPal payment option. The refined prediction model 210 may then use the binary classifier to classify the leaf tag as positive or negative based on the counts. In this example, the binary classifier may classify the leaf tag as being associated with the PayPal payment option.

The process 300 then determines (at step 335) an order of payment options based on the groups of related branches of nodes. Using the two-step approach based on candidate prediction model 208 and the refined prediction model 210, the position detection module 132 may accurately predict which portion of the programming code corresponds to which payment option. For example, the position detection module 132 may determine, for the webpage 400, that the branch of nodes 616-620 is associated with VISA payment option, the branch of nodes 622-626 is associated with PayPal payment option, the branch of nodes 628-632 is associated with Apple Pay payment option, and the branch of nodes 634-638 is associated with American Express payment option. The position detection manager 202 may then determine an order (or a relative position associated with any one of the detected payment option) based on the positions of the branches of nodes within the DOM tree 600 (which corresponds to the positions of the portions of the programming code associated with the payment options). For example, the position detection manager 202 may determine that the payment options appeared on the webpage 400 in the following order: VISA, PayPal, Apple Pay, and American Express, based on the positions (and the order in which the leaf tags appear) of the corresponding leaf tags (and the order in which the leaf tags appear) in the DOM tree 600. Furthermore, based on the order, the position detection manager 202 may also determine a relative position of any one of the payment options. For example, the position detection manager 202 may determine that the PayPal payment option appears in the second position in the list of payment options for the webpage 400.

In addition to the position, in some embodiments, the position detection module 132 may also determine other appearance characteristics of the payment options, such as a size, a color, and other appearance characteristics based on analyzing the programming code (e.g., analyzing the tags within the portion of programming code corresponding to the payment option). The position detection module 132 may also compare the appearance characteristics of the particular payment option against the appearances of the other payment options. The appearance of the particular payment option and the comparison may also be used to determine the correlation and/or to assess a risk of a transaction request as discussed herein.

The position detection module 132 may use the techniques described herein to analyze various webpages (e.g., webpages obtained by the web crawler 204). The position detection module 132 may determine the order of payment options in those webpages, and relative positions of a particular payment option (e.g., PayPal payment option) in those webpages. The position detection manager 202 may generate a report indicating the merchant websites that present a particular payment option (e.g., the PayPal payment option) at a predetermined position (e.g., a position that was agreed upon by the merchant) and the merchant websites that present the particular payment option at a different position. Furthermore, the position detection module 132 may also determine correlations between the relative position of the payment option and a metric that may be a number (or frequency), a ratio, or other metrics of transactions for which the end-users select the particular payment option for the transactions. In some embodiments, the position detection system may feed the data into a machine learning model to determine an optimal position (e.g., the position of the payment option that would produce the maximum number of selection of the particular payment option).

In some embodiments, the position detection module 132 is part of a risk assessment system for a service provider. The risk assessment system may be requested to evaluate a transaction request received via a merchant website. The risk assessment system of the service provider may then use the position detection module 132 to determine a relative position of the particular payment option among the group of related webpage elements that appear on the transaction checkout webpage of the merchant website and may use the determined relative position to determine a risk associated with the transaction request. The risk assessment system may authorize or deny the transaction request based on the risk.

While the examples illustrated above describe identifying an order and/or positions of various payment options within a transaction checkout webpage, the same techniques may be used to identify other types of related webpage elements, such as a group of related icons, a group of related selectable options, etc. without departing from the spirit of the disclosure. For example, the disclosed techniques may be used to identify positions of different web data associated with different entities within a review website, such as a ranking of different products or services.

Figure 7:
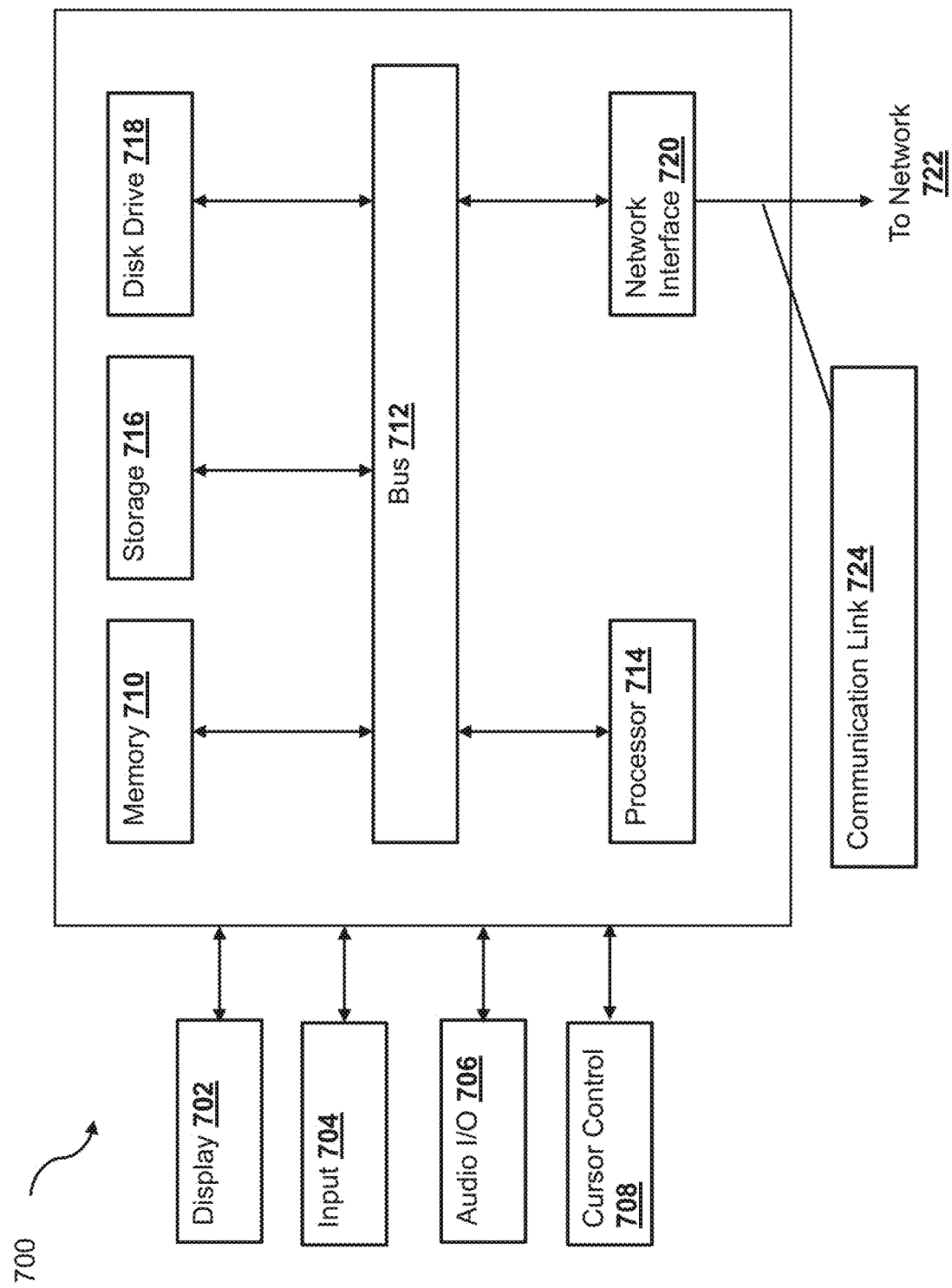
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant servers 120, 170, and 180, and the user device 110. In various implementations, the user device 110 may include a mobile cellular phone, personal computer (PC), laptop, wearable computing device, etc. adapted for wireless communication, and each of the service provider server 130 and the merchant servers 120, 170, and 180 the may include a network computing device, such as a server. Thus, it should be appreciated that the devices 110, 120, 130, 170, and 180 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the position detection of webpage elements described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
 a non-transitory memory; and
 one or more hardware processors coupled with the non-transitory memory and configured to read instructions from the non-transitory memory to cause the system to perform operations comprising:
  obtaining a webpage comprising programming code;
  generating a document object model (DOM) tree for the webpage based on the programming code, wherein the DOM tree comprises a plurality of nodes in a hierarchical structure, and wherein the plurality of nodes is associated with different web elements on the webpage;

identifying, from the plurality of nodes, a group of related branches of nodes on a particular level within the hierarchical structure of the DOM tree;

extracting, for each branch in the group of related branches of nodes, features associated with character arrangements that appear in one or more web elements associated with the branch;

determining, using at least a first machine learning model, an order of a set of selectable options associated with different service providers appearing on the webpage based on the features extracted for each branch in the group of related branches of nodes;

receiving, via the webpage, a transaction request; and assessing a risk of the transaction request based on the determined order of the set of selectable options appearing on the webpage.

2. The system of claim 1, wherein the operations further comprise:

determining, for each branch in the group of related branches of nodes, a plurality of n-grams that appear in a portion of the programming code associated with the branch; and determining a count of each of the plurality of n-grams that appear in the portion of the programming code, wherein the extracted features comprise the determined counts for the plurality of n-grams.

3. The system of claim 2, wherein the operations further comprise applying a term frequency-inverse document frequency function to the counts.

4. The system of claim 2, wherein the plurality of n-grams are trigrams.

5. The system of claim 2, wherein the operations further comprise eliminating a subset of the plurality of n-grams based on a chi-squared test.

6. The system of claim 1, wherein the first machine learning model is configured to determine, for each branch in the group of related branches of nodes, a likelihood that the branch is associated with a selectable option from a plurality of selectable option candidates based on the extracted features, and wherein the first machine learning model is trained to produce outputs having a false-negative rate below a first predetermined threshold.

7. The system of claim 6, wherein the operations further comprise:

determining, using the first machine learning model, that the selectable option is associated with a first branch in the group of related branches of nodes based on features extracted from the first branch; and verifying, using a second machine learning model, that the first branch is associated with the selectable option, wherein the second machine learning model is trained to produce outputs having a false-positive rate below a second predetermined threshold.

8. A method, comprising:

obtaining, by one or more hardware processors, a webpage comprising programming code;

generating a document object model (DOM) tree for the webpage based on the programming code, wherein the DOM tree comprises a plurality of nodes in a hierarchical structure, and wherein the plurality of nodes is associated with different web elements on the webpage;

identifying, from the plurality of nodes, a group of sibling leaf tags having a common parent node within the hierarchical structure of the DOM tree;

extracting, for each leaf tag in the group of sibling leaf tags, features associated with character arrangements that appear in one or more web elements associated with the leaf tag;

determining, by the one or more hardware processors using at least a first machine learning model, an order of a set of web elements appearing on the webpage based on the features extracted for each leaf tag in the group of sibling leaf tags, wherein the first machine learning model is configured to determine, for each leaf tag in the group of sibling leaf tags, a likelihood that the leaf tag is associated with a particular selectable option from a plurality of selectable option candidates based on the extracted features, and wherein the first machine learning model is trained to produce outputs having a false-negative rate below a first predetermined threshold;

determining, using the first machine learning model, that the particular selectable option is associated with a leaf tag in the group of sibling leaf tags based on features extracted from the leaf tag; and verifying, using a second machine learning model, that the leaf tag is associated with the particular selectable option, wherein the second machine learning model is trained to produce outputs having a false-positive rate below a second predetermined threshold.

9. The method of claim 8, further comprising:

performing an action to the webpage based on the determined order of the set of web elements appearing on the webpage.

10. The method of claim 8, wherein the operations further comprise:

shortening, for each leaf tag in the group of sibling leaf tags, a uniform resource locator (URL) address included in the leaf tag.

11. The method of claim 8, further comprising:

determining that each leaf tag in the group of sibling leaf tags includes a tag from a group of tags comprising an <iframe> tag, an <a> tag, a <button> tag, an <img> tag, and an <input> tag.

12. The method of claim 8, further comprising:

determining that the group of sibling leaf tags share a common programming code structure.

13. The method of claim 8, further comprising:

receiving, via the webpage, a transaction request; and assessing a risk of the transaction request based on the determined order of the set of web elements appearing on the webpage.

14. The method of claim 8, further comprising:

determining that a position of the particular selectable option on the webpage is different from a predetermined position; and in response to determining that the position of the particular selectable option in the webpage is different from the predetermined position, transmitting, to a user device, an alert comprising a network address associated with the webpage.

15. A non-transitory machine-readable medium having stored thereon machine-readable instructions executable to cause a machine to perform operations comprising:

obtaining a webpage comprising programming code;

generating a document object model (DOM) tree for the webpage based on the programming code, wherein the DOM tree comprises a plurality of nodes in a hierarchical structure, and wherein the plurality of nodes is associated with different web elements on the webpage;

identifying, from the plurality of nodes, a group of related branches of nodes having a common parent node within the hierarchical structure of the DOM tree;

extracting, for each branch in the group of related branches of nodes, features associated with character arrangements that appear in one or more web elements associated with the branch;

determining, using at least a first machine learning model, an order of a set of payment options appearing on the webpage based on the features extracted for each branch in the group of related branches of nodes;

determining that a position of a particular payment option on the webpage is different from a predetermined position based on the order; and in response to determining that the position of the particular payment option in the webpage is different from the predetermined position, transmitting, to a user device, an alert comprising a network address associated with the webpage.

16. The non-transitory machine-readable medium of claim 15, wherein the operations further comprise:
receiving, from the webpage, a transaction request; and
assessing a risk of the transaction request based on the determined order of the set of payment options appearing on the webpage.

17. The non-transitory machine-readable medium of claim 15, wherein the operations further comprise:
determining, for each branch in the group of related branches of nodes, a plurality of n-grams that appear in a portion of the programming code associated with the branch; and
determining, for each n-gram in the plurality of n-grams, a frequency that the n-gram appears in the portion of the programming code, wherein the extracted features comprise the determined frequencies for the plurality of n-grams.

18. The non-transitory machine-readable medium of claim 17, wherein the operations further comprise applying a term frequency-inverse document frequency function to the frequencies.

19. The non-transitory machine-readable medium of claim 17, wherein the operations further comprise eliminating a subset of the plurality of n-grams based on a chi-squared test.

20. The non-transitory machine-readable medium of claim 15, wherein the first machine learning model is configured to determine, for each branch in the group of related branches of nodes, a likelihood that the branch is associated with a payment option from the set of payment options based on the extracted features, wherein the first machine learning model is trained to produce outputs having a false-negative rate below a first predetermined threshold, and wherein the operations further comprise:
determining, using the first machine learning model, that the payment option is associated with a branch in the group of related branches of nodes based on features extracted from the branch; and
verifying, using a second machine learning model, that the branch is associated with the payment option, wherein the second machine learning model is trained to produce outputs having a false-positive rate below a second predetermined threshold.

* * * * *